United States Patent [19]

Timms

[11] 4,199,473

[45] Apr. 22, 1980

[54] OLEFIN POLYMERIZATION

[75] Inventor: Donald G. Timms, Brockenhurst, England

[73] Assignee: The International Synthetic Rubber Co. Ltd., Hampshire, England

[21] Appl. No.: 860,734

[22] Filed: Dec. 13, 1977

[30] Foreign Application Priority Data

Dec. 29, 1976 [GB] United Kingdom ............... 54242/76

[51] Int. Cl.$^2$ ............................................. C08F 4/64
[52] U.S. Cl. ............................. 252/429 C; 252/429 B; 526/124; 526/151; 526/138; 526/142; 526/143
[58] Field of Search ...................... 252/429 B, 429 C

[56] References Cited

U.S. PATENT DOCUMENTS

| 3,129,256 | 4/1964 | Hay et al. | 252/429 B X |
| 3,694,421 | 9/1972 | Vetter | 252/429 B X |
| 3,900,424 | 8/1975 | Inoue et al. | 252/429 B X |

FOREIGN PATENT DOCUMENTS 1235062  6/1971  United Kingdom ................ 252/429 B

*Primary Examiner*—Patrick Garvin
*Attorney, Agent, or Firm*—Cushman, Darby & Cushman

[57] ABSTRACT

A process for preparing a modified titanium chloride component for a titanium-containing Ziegler olefin polymerization catalyst comprising (1) treating an ether-free organo-magnesium compound with an oxygen-containing organic compound other than an ether, or with carbon dioxide or oxygen under anhydrous conditions and (2) reacting the product with titanium tetrachloride.

12 Claims, No Drawings

OLEFIN POLYMERIZATION

This invention relates to a process for preparing a modified titanium chloride component for a titanium-containing Ziegler catalyst for the polymerisation of olefins.

According to the present invention a process for preparing a modified titanium chloride component for a titanium-containing Ziegler olefin polymerisation catalyst comprises (1) treating an ether-free organo-magnesium compound with an oxygen-containing organic compound other than an ether; or with carbon dioxide or oxygen under anhydrous conditions and (2) reacting the product with titanium tetrachloride.

The invention also includes the preparation of a titanium-containing Ziegler olefin polymerisation catalyst by admixing the modified titanium chloride with an organo-aluminum cocatalyst, and the olefin polymerisation catalyst so produced. The invention further includes a process for the polymerisation of one or more olefins in the presence of such an olefin polymerisation catalyst.

The organo-magnesium compound which is used in the process of the present invention is preferably a Grignard reagent of formula RMgX where R is a hydrocarbyl group such as an alkyl (including cycloalkyl), aryl, aralkyl, allyl or cyclodiene group, and X is chlorine, bromine or iodine, or a dihydrocarbyl magnesium compound of formula $R_2Mg$ where each R, which may be the same or different, is a hydrocarbyl group such as exemplified above. Grignard reagents of formula RMgX are most preferred. Examples of suitable organo-magnesium compounds are phenyl magnesium bromide, methyl or ethyl magnesium bromide, allyl magnesium bromide, cyclopentadienyl magnesium chloride, ethyl magnesium iodide, t-butyl magnesium chloride, n-propyl magnesium bromide, magnesium diphenyl, and magnesium cyclopentadienide. Such compounds are generally obtained as a solution or dispersion in an ether, for example, diethyl ether, but in the process of the invention it may be preferable to employ an organo-magnesium compound which has been prepared in the absence of ether. However, when ether has been employed in the preparation of the compound, the ether may be removed by, for example, gently heating the ethereal solution or dispersion under a stream of nitrogen.

The oxygen-containing organic compound used in step (1) is preferably an alcohol, especially an alcohol having 1 to 8 carbon atoms. Ethanol is very suitable. An epoxide or a carbonyl compound, for example, an ester, aldehyde, ketone, acid chloride, or carboxylic acid may also be used as the oxygen-containing organic compound in the present invention. As with alcohols, carbon dioxide and oxygen, all of these compounds introduce a C—O—Mg bond into the organo magnesium compound. Whatever oxygen-containing organic compound is employed in the process of the invention it is generally preferred to avoid a stoichiometric excess with respect to the organo magnesium compound.

The treatment and reaction step (1) is preferably carried out under anhydrous nitrogen and may be carried out at room temperature. Preferably it is carried out in inert hydrocarbon diluent. This diluent may be aliphatic (including cycloaliphatic), for example, hexane, heptane or cyclohexane or aromatic such as benzene or tetralin.

If desired, the product of the treatment and reaction step (1) may be reacted with a halogen-containing organic compound especially an acid halide prior to step (2).

Step (2) of the process, the reaction of the product of step (1) with titanium tetrachloride, is preferably carried out under reflux conditions and preferably in the presence of inert hydrocarbon diluent, such as may be used in step (1). Likewise it is preferably carried out under anhydrous nitrogen.

At any stage of the process the product may be washed to remove unreacted components. Heating in the inert hydrocarbon may also be advantageous. It is particularly advantageous to wash the modified titanium chloride product of the process using, for example, Soxhlet extraction or suspension decantation using further inert hydrocarbon.

To prepare the titanium-containing Ziegler olefin polymerisation catalyst, the modified titanium chloride is admixed with an organo-aluminum cocatalyst. This is preferably an aluminum hydrocarbyl or a hydrocarbyl halide. The hydrocarbyl may be, for example, aluminium trialkyl and the aluminium hydrocarbyl halide, for example, an aluminium alkyl halide. Advantageously an aluminium hydrocarbyl and hydrocarbyl halide in admixture are used as cocatalyst. Aluminium trialkyls and aluminium alkyl halide which have an alkyl:halogen ratio of greater than 1:1 (preferably an aluminium dialkyl halide) or a mixture thereof are preferred. In addition to acting as cocatalyst, the organo-aluminium compound acts as a scavenger for impurities in the polymerisation system. Preferably the alkyl groups in the aforesaid aluminium alkyls and alkyl halides have 2 to 10 carbon atoms.

Polymerisation is preferably effected in the liquid phase, and preferably in a hydrocarbon diluent which is not polymerisable under the polymerisation conditions used. Examples of suitable dilients are hexane, cyclohexane and petroleum ether. Reaction is preferably carried out in the substantial absence of oxygen, moisture and other compounds which may deactivate the catalyst. Preferably the organo-aluminium compound used as cocatalyst is added to the monomer(s) and diluent before the addition of the modified titanium chloride.

Polymerisation may be carried out at a temperature of, for example, 30° C. or more, up to, for example 90° C. Higher or lower temperatures may be used if desired. Temperatures in the range 50° C. to 90° C. are most effective. The diluent is preferably saturated with one or more of the monomers before contact with the catalyst. The pressure at which the monomer(s) is/are polymerised is conveniently in the range 1 to 50 atmospheres (700 psi) although higher pressures, for example, up to 5,000 atmospheres (70,000 psi) or sub-atmospheric pressures, may be used if desired.

The polymerisation process is especially useful for the polymerisation of aliphatic olefins, and especially alpha-olefins having 3 to 10 carbon atoms, alone or with one or more of each other. It is particularly effective for the preparation of polypropylene, especially where the modified titanium chloride is used with aluminium triethyl and/or aluminium diethyl chloride as cocatalyst. Optionally other compounds may be added to the polymerisation system to modify the reaction, for example, to increase yield and/or isotactic content. Examples of such modifying compounds are hexamethyl phosphoramide, tri-n-butyl-phosphine and aryl esters.

The process of the invention is illustrated by the following Example:

EXAMPLE 3 g. magnesium turnings are covered with dry ether under nitrogen and a crystal of iodine is added. The mixture is stirred and heated under a stream of nitrogen until all the ether is removed. This process effectively activates the magnesium for reaction with the organic halides. 50 ml. dry cyclohexane are added, then the mixture is stirred and heated to reflux temperature. 8 ml. dry n-butyl chloride are added in small portions over a period of about 2 hours. The mixture is heated for a further 2 hours then allowed to cool. 20 ml. cyclohexane are added, the mixture is stirred gently then transferred under nitrogen to another container via a copper gauze filter which removes unreacted magnesium. Analysis of the filtered dispersion shows it to be 0.71 Molar with respect to magnesium and 0.86 Molar with respect to chlorine.

50 ml. of the dispersion are reacted with 40 m. mol. anhydrous ethanol, added dropwise at room temperature with rapid stirring. The mixture is then reacted with 40 m. mol. benzoyl chloride under similar conditions. The product is left overnight at room temperature. 20 ml. mol. titanium tetrachloride are added and the mixture is heated to reflux for 4 hours.

An aliquot containing 1 ml. mol. titanium is added to 200 ml. dry heptane containing 5 m. mol. aluminium tri-ethyl under an atmosphere of propylene. Polymerisation is continued for 4 hours at 60° C. 45 g. of polymer of 95% isotacticity are produced.

In a similar manner ethylene is polymerised with essentially the same results.

What we claim is:

1. A process for preparing a modified titanium chloride component for a titanium containing Ziegler olefin polymerisation catalyst comprising (1) reacting an organo-magnesium compound of the formula RMg X or R$_2$Mg where R is a hydrocarbyl group and X is chloride, bromine or iodine with an oxygen-containing compound which introduces a C—O—Mg bond into the organo-magnesium compound or with carbon dioxide or oxygen under anhydrous condition, reacting the product of step (1) with a carboxylic acid chloride and then (2) reacting the product with titanium tetrachloride.

2. A process for preparing a modified titanium chloride component for a titanium containing Ziegler olefin polymerisation catalyst comprising (1) reacting an organo-magnesium compound of the formula RMg X or R$_2$Mg where R is a hydrocarbyl group and X is chlorine, bromine or iodine with an oxygen-containing compound which introduces a C—O—Mg bond into the organo-mAgnesium compound or with carbon dioxide or oxygen under anhydrous condition, reacting the product of step (1) with benzoyl chloride and then (2) reacting the product with titanium tetrachloride.

3. A process according to claim 2 wherein the oxygen-containing organic compound is an alcohol.

4. A process according to claim 2 wherein the oxygen-containing organic compound is ethanol.

5. A process for the preparation of a titanium-containing Ziegler olefin polymerisation catalyst which comprises admixing organo-aluminium cocatalyst to titanium tetrachloride modified by the process of claim 2.

6. A process according to claim 2 wherein the organo-magnesium compound is reacted with ethanol.

7. A process according to claim 6 wherein the product of step (1) is reacted with benzoyl chloride prior to step (2) and the organo-magnesium compound is butylmagnesium chloride.

8. A process according to claim 5 wherein the organo-magnesium compound is reacted with an alcohol.

9. A process according to claim 8 wherein the alcohol is ethanol.

10. A process according to claim 9 wherein the organo-aluminium cocatalyst is an aluminium hydrocarbyl or an aluminium hydrocarbyl halide.

11. A process according to claim 5 wherein the organo-aluminium cocatalyst is an aluminium hydrocarbyl or an aluminium hydrocarbyl halide.

12. A process according to claim 2 wherein step (1) is carried out at room temperature and step (2) is carried out at reflux in an inert hydrocarbon diluent.

* * * * *